United States Patent [19]
Agranat

[11] 3,722,694
[45] Mar. 27, 1973

[54] FILTRATION DEVICE

[75] Inventor: Edward A. Agranat, Weston, Mass.

[73] Assignee: Romicon, Inc., Lexington, Mass.

[22] Filed: June 10, 1970

[21] Appl. No.: 45,115

[52] U.S. Cl..................................210/321, 210/433
[51] Int. Cl. ...............................................B01d 31/00
[58] Field of Search........210/23, 321, 323, 433, 490, 210/491, 500

[56] References Cited

UNITED STATES PATENTS

| | | | |
|---|---|---|---|
| 3,442,389 | 5/1969 | Mendelson | 210/491 X |
| 3,542,204 | 11/1970 | Clark | 210/433 X |
| 2,353,489 | 7/1944 | Newcomb | 210/321 |
| 3,608,730 | 9/1971 | Blaha | 210/433 X |
| 3,612,282 | 10/1971 | Cheng | 210/321 |

Primary Examiner—Frank A. Spear, Jr.
Attorney—R. W. Furlong

[57] ABSTRACT

A filtration apparatus having an inlet manifold, an outlet manifold, a filtrate region therebetween, and at least one filter cartridge which is removable and replaceable through one of the manifolds. The removably mounted filter cartridge extends between the manifolds through the filtrate region, and has a header adjacent each end, in communication with each respective manifold and sealing the filtrate region of the apparatus from each manifold thereof, respectively.

12 Claims, 7 Drawing Figures

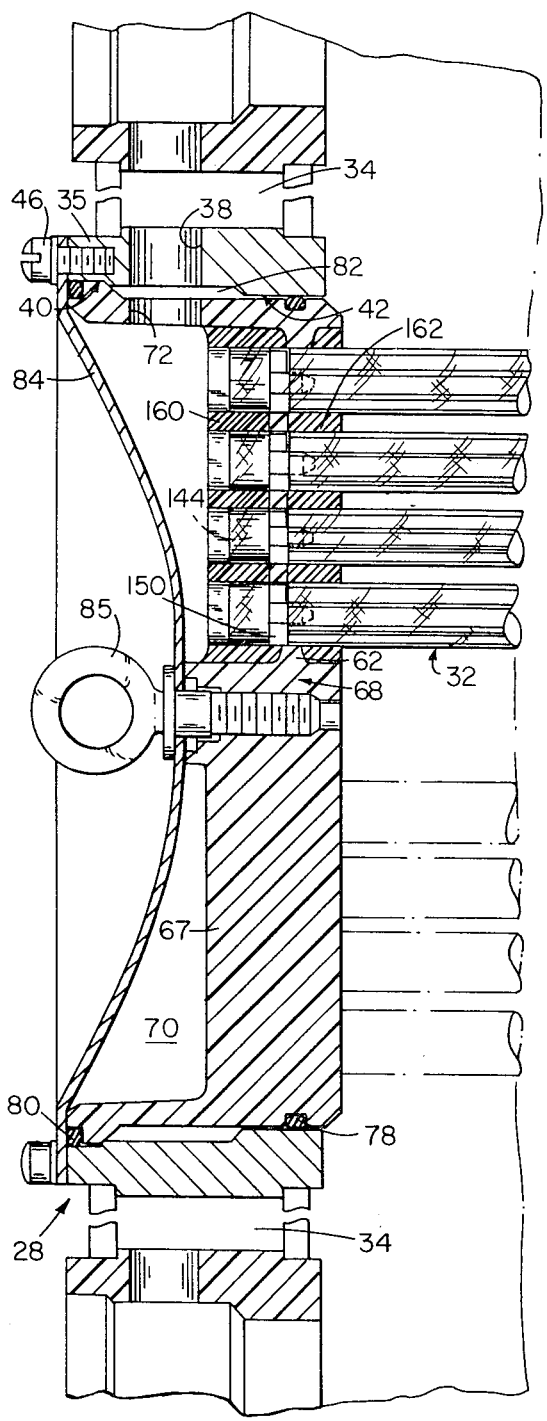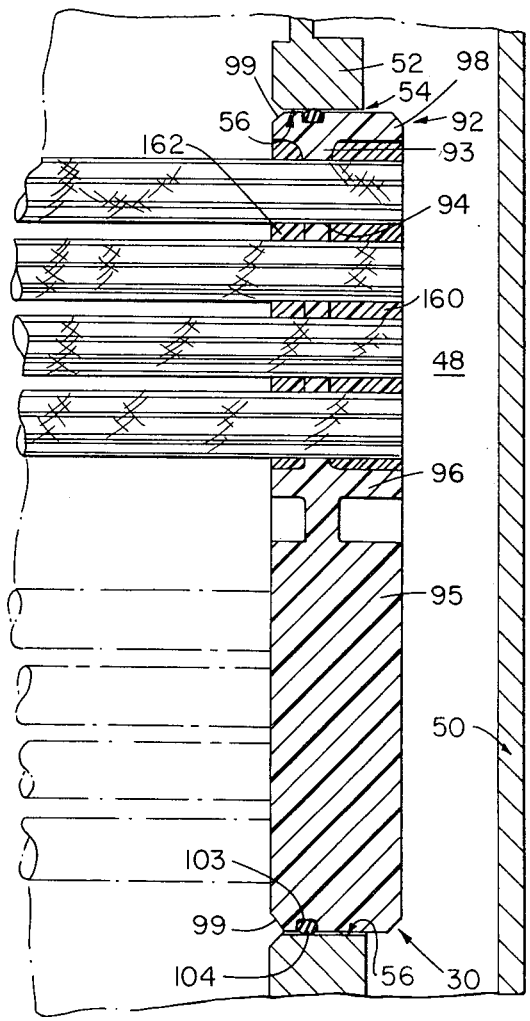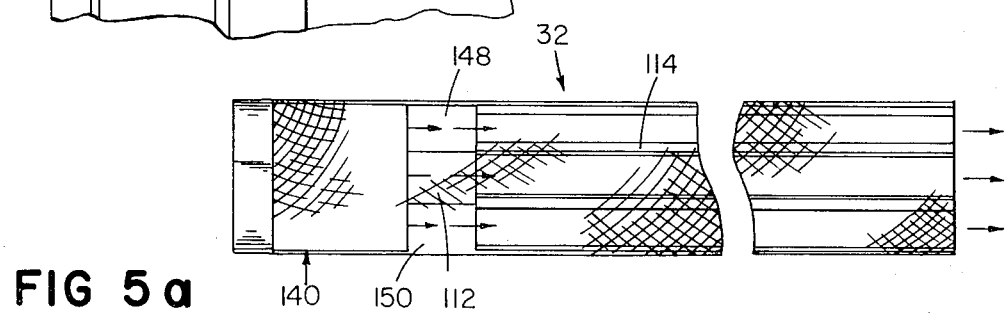

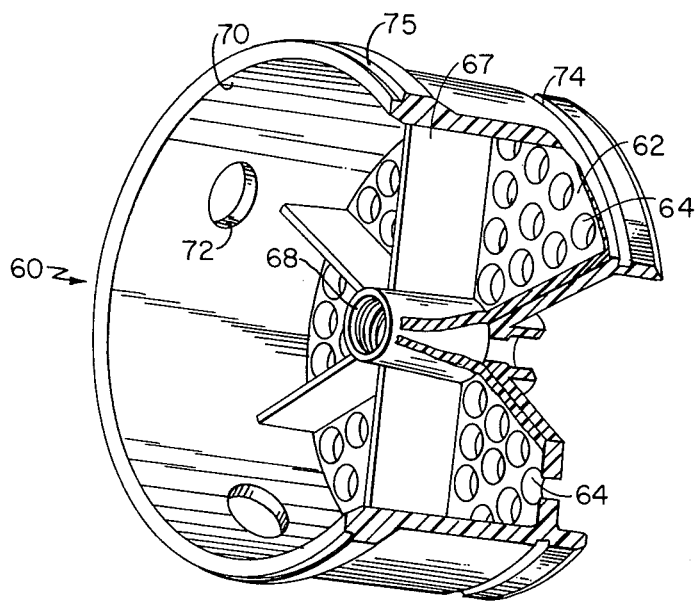
FIG 4
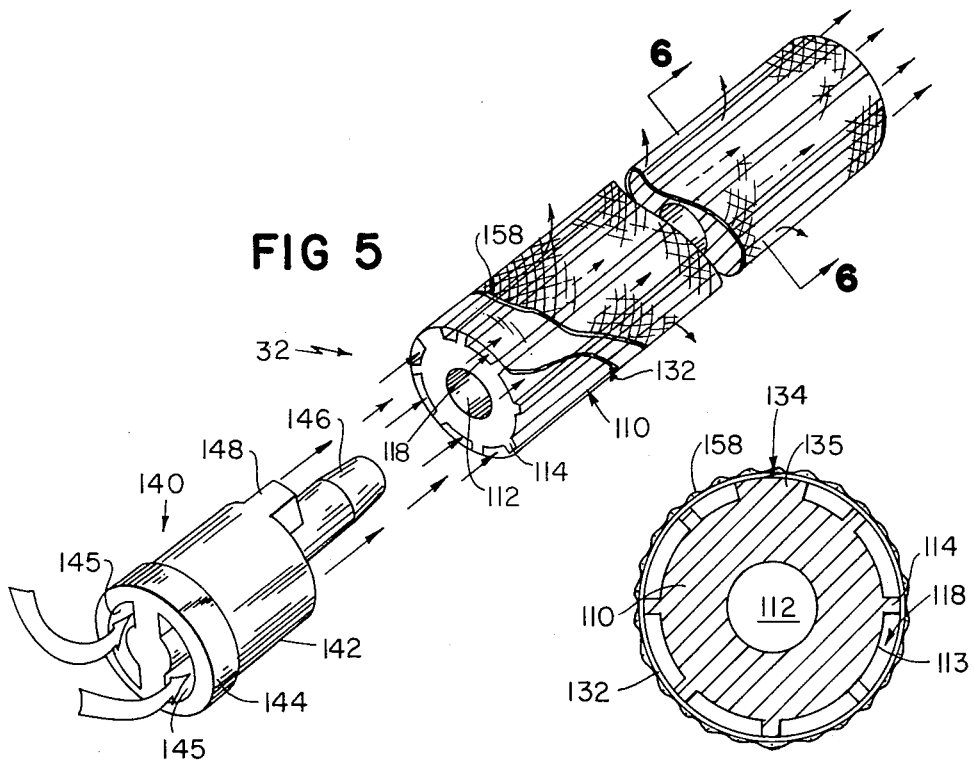
FIG 5
FIG 6

FILTRATION DEVICE

This invention relates to filtration of materials and particularly to ultrafiltration devices employing tubular membrane filters.

Ultrafiltration is a process of separation whereby a solution, containing a solute of molecular dimensions significantly greater than the molecular dimensions of the solvent in which it is dissolved, is depleted of the solute by being subject to such pressure that the solvent is forced to flow through a membrane. "Ultrafiltration" is the term preferably used to describe such pressure-activated separations involving solutions of solute of from about 500 molecular weight and above; the term is also conveniently used for processes involving, instead of dissolved molecules, colloidal-sized particles.

It is an object of this invention to provide simple and versatile modular ultrafiltration devices having easily and readily replaceable ultrafiltration units.

Another object is to provide strong and durable yet disposable ultrafiltration units for use in ultrafiltration devices, which units can readily be removed and replaced with new ones when necessary.

A further object is to provide novel and improved support for filter units having tubular filtration membranes.

Another object is to provide an improved ultrafiltration device having tubular-shaped ultrafiltration units utilizing anisotropic membranes and thin-channel filtration techniques.

The invention features a filtration apparatus having an inlet manifold, an outlet manifold, a filtrate region disposed therebetween, and at least one filter cartridge which is removable and replaceable through one of the manifolds. The removably mounted filter cartridge extends between the manifolds through the filtrate region, and has a header adjacent each end, in communication with each respective manifold and sealing the filtrate region of the apparatus from each manifold thereof, respectively.

A preferred cartridge includes at least one tubular membrane extending between the headers, and a stiffening member for the membrane, such as a core located within the membrane, and is inserted into the manifolds in a direction axial to the membrane.

The sealing surfaces of the cartridge are preferably dimensioned so that the sealing surface of the first-inserted header is smaller than that of the last-inserted header and that the cartridge can be sealed within the manifolds in only one orientation. Suitable peripheral sealing surfaces may be provided by exposed portions of resiliently compressible sealing rings (O-rings) surrounding the headers. Also, advantageously, the outer or last-inserted header may have two sealing surfaces, of which the outer is larger, and the inner is at least as large as the sealing surface of the first-inserted header. These two sealing surfaces are arranged on either side of a closed fluid flow path from manifold to header. Fastener means provided for securing the cartridge, once inserted, in the manifolds may include a sealing member which seals the last-inserted cartridge within its manifold and defines a fluid flow path from the manifold to the membranes. This sealing member, e.g., may also engage the aforesaid outer sealing surface.

Preferred headers each have a planar support member containing a plurality of apertures for receiving a plurality of tubular membranes, and the apertures are arranged to support the membranes in parallel. The headers also have reinforcing members, extending transversely of the axis of the tubular membranes, which may be in the form of radially extending ribs formed integrally with the headers. Suitable adhesives are disposed in adhesive-confining chambers, defined by peripheral walls, on each side of the support members to secure the tubular membranes therewithin. The adhesive adjacent the inner side of each support member is preferably more flexible than that adjacent the outer side.

Preferred tubular membranes are anisotropic ultrafiltration membranes, each comprising a porous outer support layer and a less porous barrier layer integral therewith, with the barrier layer located on the inside of the tubular membrane. A preferred rigid supporting core therefor is constructed to define a plurality of thin axially extending channels between the core and the membrane. Specific preferred core-membrane structures are the invention of Peter N. Rigopulos, and are claimed in the assignee's copending application, Ser. No. 44,974 filed June 10, 1970, and entitled "ULTRAFILTRATION," now U.S. Pat. No. 3,682,318.

Other objects, features and advantages will appear to one skilled in the art from the following description of a preferred embodiment of the invention, taken together with the attached drawings thereof, in which:

FIG. 3 is an enlarged sectional view of this filter cartridge along the line 3—3 of FIG. 2, with adjacent portions of the filtration apparatus shown in section, and with all but four filter elements removed from the cartridge;

FIG. 4 is an elevational view, partially broken away, and partially in phantom, of a molded portion of a header;

FIG. 5 is an exploded view, partially broken away, of a filter element;

FIG. 5a is an elevational view of that filter element; and,

FIG. 6 is a sectional view along line 6—6 of FIG. 5.

Figure 1:
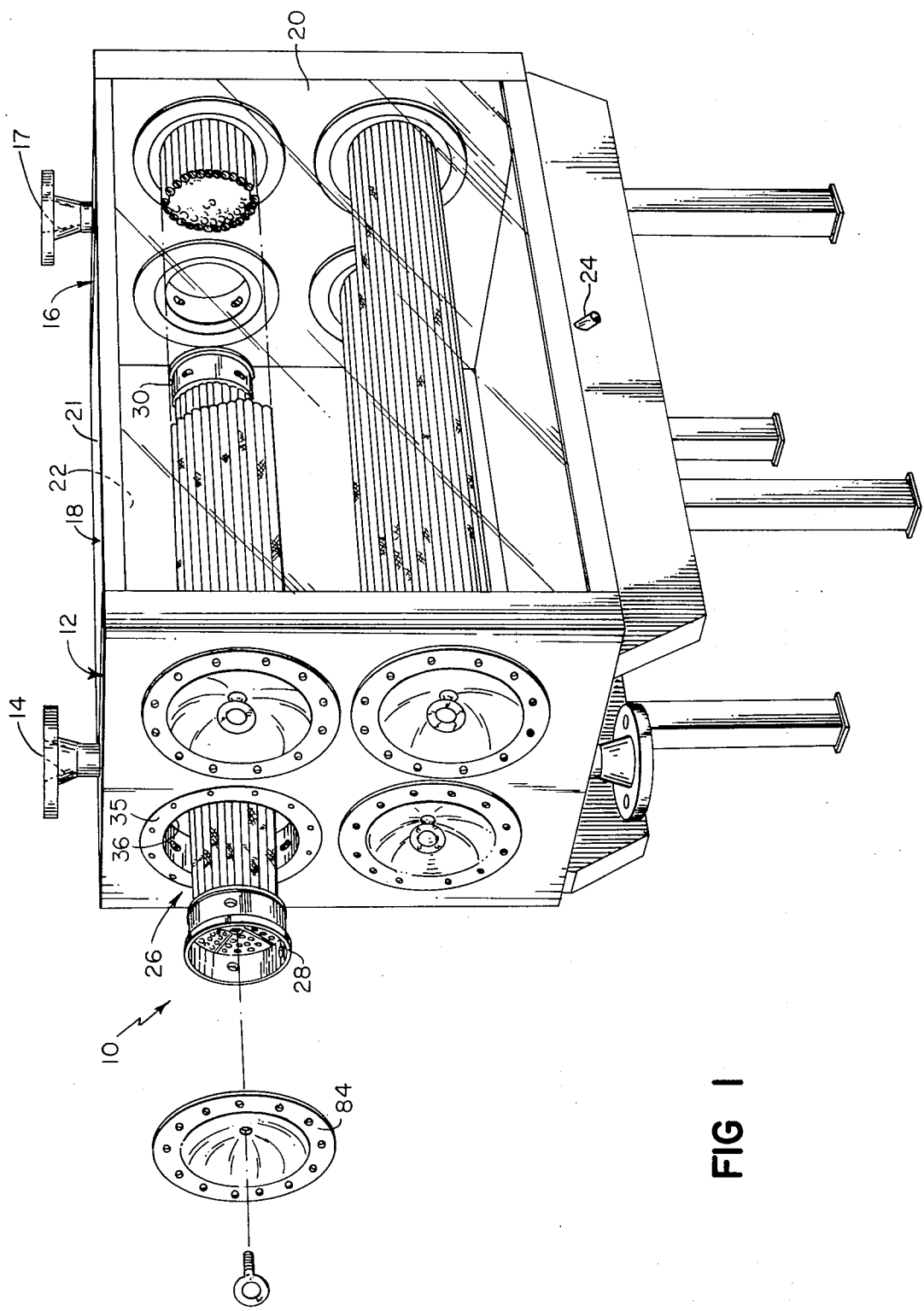
FIG. 1 is a perspective view of an ultrafiltration apparatus having replaceable filter cartridges.

The figures show a filtration apparatus 10 having an inlet manifold 12, a fluid inlet 14 thereto, an outlet manifold 16, a fluid outlet 17 therefrom, a filtrate chamber 18 between the manifolds and enclosed by transparent walls 20, 21, 22 and a fluid outlet 24 from chamber 18. Each one of a plurality of replaceable filter cartridges 26 has a first (inlet) header 28 and a second (outlet) header 30, between which are supported, in a manner described below, a plurality of tubular filter elements 32. Each cartridge 26 is removably mounted between manifolds 12 and 16 through headers 28 and 30, respectively.

Figure 2:
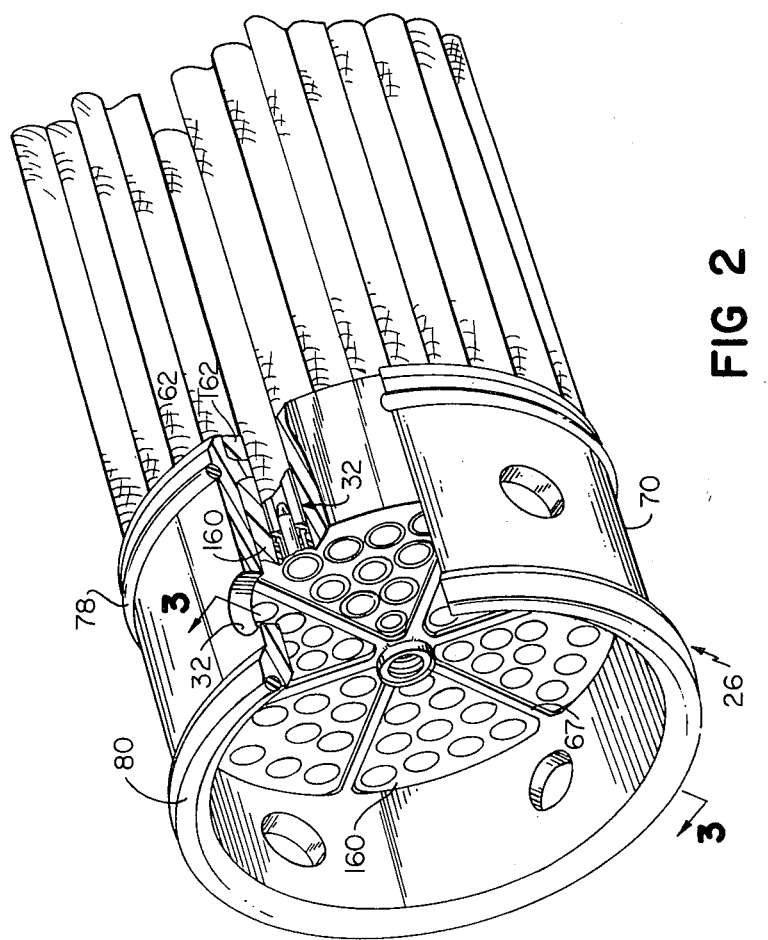
FIG. 2 is an elevational view, partially broken away, of a section of one such filter cartridge.

Referring to FIGS. 1–4, inlet manifold 12 includes a fluid chamber 34 and a plurality of cylindrical collars or flanges 35 extending between opposite faces of the manifold to provide access to chamber 18 through openings 36. Apertures 38 through flanges 35 provide communication between chamber 34 and filtrate chamber 18. Each flange has a cylindrical sealing surface 40 of relatively large diameter adjacent its outer face and a second cylindrical sealing surface 42 of smaller diameter disposed inwardly of surface 40 toward the filtration chamber 18.

Outlet manifold 16 has a fluid reservoir 48 defined between outer wall 50 and inner wall 52. A plurality of openings 54 through wall 52 are aligned with openings 36 of inlet manifold 12. Sealing surfaces 56 are cylinders of diameter equal to (or smaller than) those defined by surfaces 42 and are chamfered at their inner and outer edges.

Extending through chamber 18 from inlet manifold 12 to outlet manifold 16 are filter cartridges 26 each of which is removable and extends through aligned openings 36 and 54 in sealed relation to the manifolds.

Inlet header 28 of each filter cartridge includes a molded plastic (e.g., fiber-reinforced nylon) base frame 60 (FIG. 4) having a support disc 62 which is pierced by a plurality of filter element-receiving apertures 64. A plurality of spaced radial reinforcing ribs 67 extend between internally threaded boss 68 and annular outer wall 70 on opposite sides of disc 62. The apertures 64 between adjacent ribs are arranged in generally triangular sector-shaped arrays.

Annular wall 70 of the header has a chamfer at its inner end for facilitating cartridge insertion and fluid apertures 72 for providing fluid communication; circumferential grooves 74, 75 in wall 70 are each sized to accept a rubbery O-ring 78, 80, respectively, the outer sealing surfaces of which in turn cooperate with sealing surfaces 42, 40 respectively, to seal header 28 in inlet manifold in a fluidtight seal. A narrow annular passage 82 between flange 35 and wall 70 provides fluid communication through apertures 38 and 72 from fluid chamber 34 of the inlet manifold to header 28 of each filter cartridge. A dished (e.g., stainless steel) sealing member 84 covers each opening 36 and secures each filter cartridge in place, the sealing member 84 being fastened to flange or collar 35 by means of bolts 46 and to filter cartridge 26 by means of eyebolt 85 threaded into boss 68 at the center of disc 62. O-ring 80 ensures a fluid-tight seal between member 84, collar 35, and header wall 70 adjacent the outer face of each opening 36, while O-ring 78 provides a fluid tight seal between header wall 70 and collar 35 adjacent the inner face of openings 36 at chamber 18.

The second (outlet) header 30 also has a molded plastic (e.g., fiber-reinforced nylon) base frame 92 having a support disc 93 pierced by a plurality of filter-element receiving apertures 94 corresponding in number and arrangement to the apertures 64 in header 28. A plurality of spaced radial reinforcing ribs 95 extend from boss 96 to annular outer wall 98 on opposite sides of disc 93, the apertures 94 being arranged in generally triangular, sector-shaped arrays, Annular wall 98 has a chamfer 99 for easy cartridge removal, and a circumferential groove 103 in its outer surface to accept a rubbery O-ring 104, the outer sealing surface of which in turn cooperates with sealing surface 56 to seal header 30 in manifold opening 54 in a fluid-tight seal.

Referring to FIGS. 3, 5, 5a and 6, each filter element 32 of the filter cartridge 26 has a plastic (e.g., an extruded polyolefin such as polypropylene), liquid-impermeable stiff tubular supporting core 110, which has an inner cylindrical bore 112. A plurality of spaced longitudinally extending ribs 114 project from outer cylindrical wall surface 113 of the core and define a plurality of shallow axial grooves 118, preferably about 10–30 mils deep; that is, the ribs 114 are all of approximately the same radial height, their outer surfaces lying in a cylinder coaxial with cylindrical wall surface 113. Core 110 may be of any desired cross-sectional configuration, triangular, rectangular, or polygonal as well as circular. The ribs are preferably uniformly spaced apart by a distance of one-eighth to one-fourth inch on the circumference (i.e., 20° to 60°). While the ribs 114 in the embodiment illustrated are parallel to the axis of core 110, they may also extend spirally longitudinally of the core. A filtration membrane in the form of a tube 132, which may be made from a flat rectangular sheet by sealing its margins together along a zone 134 extending longitudinally or spirally of the tube, is supported by and in contact with the outer surfaces of ribs 114. Zone 134 is preferably located at an enlarged rib 135. The overall diameter of each tube 132 is of the order of one-fourth to one-half inch, and the tubular membrane thus forms with grooves 118 between the ribs longitudinally extending fluid passages approximately 10 to 30 mils in depth and one-eighth to one-fourth inch wide.

At the inlet end of core 110 is provided an extension plug 140 which may be molded of the same material as the core and which provides means for introducing fluid into passages 118. The plug 140 is in the form of a cylinder 142 having a diameter equal to that formed by the outer surfaces of ribs 114, together with an end flange or shoulder 144 of slightly greater diameter serving to protect the end of membrane tube 132 which abuts against the flange. Plug 140 is provided with axial apertures 145 and an imperforate central hub 146 adapted to enter into bore 112 of core 110 in a snug fit. One or more axially projecting spacer lugs 148 are provided to abut the end of core 110 to leave a gap 150 between the end walls of plug 140 and core 110 through which fluid may flow from axial apertures 145 to passages 118. Apertures 145 are in turn in communication with the interior of header 28 at the inlet end of filter cartridge 26. Advantageously, a porous adhesive tape may be applied to the joint along the axial sealing zone 134.

Unles the outlet end of the membrane is also occasionally to be under higher fluid pressure than the inlet end (as when units such as apparatus 10 are arranged in series for additional filtration), no extension plug is needed at that end; the thin channels merely communicating directly, as shown in FIG. 5, with header 30 and outlet manifold 16.

A porous or perforate reinforcing member, such as a braided tubular member 158 is arranged as shown in FIG. 5 to encompass the outer surface of membrane 132 so as to secure the membrane on the core and reinforce and confine it against the fluid pressure applied radially outwardly thereto in the filtration apparatus. Among the useful materials from which reinforcing member may be made are nylon, fiberglass, and suitable polyesters (e.g., polyethylene terephthalate), particularly in the form of filaments or threads suitable for braiding.

Each filter element 26 extends at opposite ends through apertures 64 and 96 of headers 28 and 30, with the ends projecting through support discs 62 and 93, respectively, and secured in the headers by appropriate sealing or adhesive materials 160, 162. Advantageously, sealing material 160 is a rigid epoxy resin (e.g., an amine cured Bis-phenol A-type epoxy), whereas sealing material 162 is a more flexible epoxy (e.g., an anhydride cured Bis-phenol A-type epoxy). The sealing materials preferably completely fill the sector-shaped chambers between the filter-elements in the manner of a potting compound forming, in effect, two one-piece headers.

Preferred membranes are ultrafiltration membranes; and, in particular, "anisotropic" ultrafiltration membranes, which consist of a support layer and a barrier layer, so constructed that the barrier layer will pass less of a given solute than will the support layer. Typically, these membranes are formed of polymers having good mechanical integrity, most advantageously those crystalline and/or glassy thermoplastic polymers known to the art. By crystalline and glassy polymers are meant those materials which possess from about 5 to 50 percent by weight crystallinity as measured by X-ray diffraction techniques known to the art and/or a glass transition temperature (Tg) of at least about 20°C. Particularly advantageous are polymers of inherently low water sorptivity, which unlike the cellulose acetate materials known to the membrane art may be allowed to dry during storage without losing their beneficial mechanical and processing characteristics. These polymers are those having water-absorptivities of less than about 10 percent by weight of moisture at 25°C and 100 percent relative humidity. Among the useful polymers are polycarbonates (e.g., those prepared under the trade designation "Lexan," unplasticized polyvinyl chloride, suitable copolymers of polyvinyl chloride, and the modacrylic polymer sold under the trade name "Dynel" by Union Carbide Corporation).

Preferred anisotropic membranes are cast, from a casting dope of the polymer in an organic solvent, as a film on an additional support, such as a weftless polyethylene sheet. The exposed side of the film is then contacted with a diluent characterized by a high degree of miscibility with the organic solvent and a sufficiently low degree of compatibility with the casting dope to effect rapid precipitation of the polymer. The diluent is maintained in contact with the membrane until substantially all the solvent has been replaced with diluent.

The resultant anisotropic membranes consist of the base support which has no effect on the filtration properties of the cast polymer, a macroscopically thick film of the cast porous polymer support portion, usually more than about 0.002 and less than about 0.050 of an inch in thickness, and at the exposed surface of this film, an exceedingly thin, but relatively dense barrier layer or "skin" of from about 0.1 to 5.0 microns thickness of microporous polymer in which the average effective pore diameter is in the millimicron range, for example 1.0 to 500 millimicrons—i.e., about one-tenth to one-hundredth the thickness of the skin. The support portion thus comprises a much more coarsely porous polymer structure through which fluid can pass with little hydraulic resistance. When such a membrane is employed as a "molecular filter" with the "skin-side" upstream in contact with fluid under pressure, virtually all resistance to fluid flow through the membrane is encountered in the "skin," and molecules or particles of dimensions larger than the pores in the "skin" are selectively retained. The over-all hydraulic resistance to fluid flow through the membrane is very low, as is the tendency of such membranes to become plugged or fouled.

Since the cast polymer and base support may be of different materials, (e.g., polyethylene and a modacrylic) joining their adjacent surfaces in the sealing zone 134 is preferably done by employing an adhesive between the surfaces being joined, as well as by applying an additional adhesive strip (e.g., an adhesived coated acrylic such as nylon) along the joint. If these facing surfaces are of the same or similar materials, the surfaces may be, instead, heat sealed along zone 134.

The membrane is oriented with the barrier layer facing the core 110. It is unnecessary to seal the membrane to the core, since the subsequently applied braided cover, which is tensioned against the membrane, will maintain the membrane in position, and also control therefore the shape and outer diameter of the membranes. The braid further prevents creep of the membrane axially along the core.

In operation, when assembled, a fluid material to be filtered is introduced under pressure into inlet manifold 12 through inlet 14, through apertures 38 and 72 to header 28, and through the apertures in end plugs 120 into the thin channels 118 provided between each core 110 and its supported membrane 132. Ultrafiltrate passes through the membranes 132 into filtration chamber 18 in the direction of the arrow in FIG. 5, and exits through outlet 24, whereas concentrated solution (or filtered fluid) passes through thin channels 118 in the direction of the dotted arrows in FIG. 5, out into outlet manifold 16, and exits through outlet 17. A plurality of modular units, each like apparatus 10, may be connected in series for further concentration of solution, if such is desired.

The end plug protects the end of the membrane by causing fluid to enter substantially downstream thereof, thus preventing leakage around the end of the membrane. The end plug arrangement is necessitated by the very high pressures (e.g., 200 p.s.i.) and flow velocities (e.g., 10 ft./sec.) achieved in the apparatus.

The shallow depth of the axial channels provided between the core and membrane provides a large are of membrane surface exposed to a relatively small adjacent volume of fluid, and provides laminar flow along the membrane, thus resulting in highly efficient filtration.

When the membranes have reached their useful life, they are changed by simply removing and disposing of the entire cartridge, and inserting a new cartridge. The relative sizes of the inner and outer cartridge headers provide for only one mode of cartridge insertion, and the arrangement of the sealing surfaces cause the cartridge to be automatically sealed with a simple axial insertion.

The combination of reinforcing ribs 67, 97 and rigid and flexible epoxies, 160, 162 cooperate to provide a rigid, sealed header, which is still somewhat shock-absorbent. The ribs reinforce the rigid epoxy against cracking when fluid pressure is applied against the support discs 62, 93, whereas the rigid epoxy 160 itself firmly secures the filter elements in the headers; and, the more flexible, inner epoxy 162 seals against leakage.

Although filtrate chamber 18 is enclosed, it will be understood that "chamber" merely means a region of the apparatus where filtrate passing through the membrane walls may be recovered separately from the concentrated solution. Thus, it is not necessary for some purposes that there be enclosing walls, such as walls 20, 21 and 22 in lieu thereof, for example, a suitable collection trough or troughs could be located to receive filtrate from the filtrate region.

Other embodiments will occur to those skilled in the art and are within the following claims.

What is claimed is:

1. Filtration apparatus comprising an inlet manifold, an outlet manifold, walls joining said manifolds and enclosing a filtrate region between said manifolds, and at least one removably mounted filter cartridge extending between said manifolds through said region, said cartridge having first and second headers, one header adjacent each end in communication with each manifold through an opening therein and having means for releasably sealing the header to the opening in the corresponding manifold to separate the filtrate region from each manifold respectively, and having at least one tubular membrane extending between said first and second headers and a longitudinally rigid core within said membrane, said filter cartridge being mounted for removal and replacement through said manifold opening.

2. A filter cartridge comprising
a first header including a first peripheral sealing surface, a second header spaced from the first including second and third external spaced apart peripheral sealing surfaces, the overall diameter of both second and third external surfaces being at least equal to that of said first sealing surface to enable said cartridge to be passed endwise through a pair of spaced manifold openings and to be releasably mounted with each header in sealing engagement with one such opening, said second header having at least one opening between said spaced apart seals providing communication between the inside and the outside of said header, at least one tubular membrane extending between and sealed to the headers, and a longitudinally rigid stiffening member for said membrane extending between said headers.

3. The cartridge of claim 2 wherein said headers include resiliently compressible annular sealing rings, said sealing surfaces being provided by exposed portions of said rings.

4. The cartridge of claim 3 wherein said stiffening member is a core within said membrane.

5. The cartridge of claim 2 wherein said cartridge includes a plurality of tubular membranes arranged generally parallel to each other and sealed to said headers.

6. The cartridge of claim 5 wherein each said header has an adhesive confining chamber adjacent each said support member, and a non-porous adhesive substance in each said chamber surrounding the respective end of each said tubular membrane to seal said membrane in said headers in fluid-tight seals.

7. The cartridge of claim 6 wherein each header has two adhesive confining chambers, one adjacent each side of said support member, and a non-porous adhesive in each said chamber, the adhesive in the innermost chambers being more flexible than the adhesive in the outer chambers.

8. The cartridge of claim 5 wherein each said header has a plurality of reinforcing members extending transversely of the axis of said tubular membranes.

9. The cartridge of claim 8 wherein said reinforcing members are formed integrally with said headers and are arranged radially of the axis of said tubular membranes.

10. A filter cartridge comprising an inlet header, an outlet header, and a plurality of tubular membranes extending between said headers, each said header comprising a planar supporting member having a plurality of apertures for receiving therein respectively said plurality of tubular membranes,
a peripheral wall defining an adhesive confining chamber adjacent each side of said supporting member,
a plurality of solid radially extending ribs disposed on each side of said member and extending to the respective said wall, and
an adhesive substance in each of said adhesive confining chambers to secure said tubular membranes in said headers.

11. The filter cartridge of claim 10 wherein the adhesive substance in said second chambers is more flexible than the adhesive substance in said first chambers.

12. Filtration apparatus comprising an inlet manifold, an outlet manifold, and a plurality of removably mounted unitary rigid filter cartridges extending between said manifolds, each said cartridge having first and second headers, one header adjacent each end in communication with each manifold through an opening therein and having means for releasably sealing the header to the opening in the corresponding manifold, having a plurality of tubular membranes extending between said first and second headers, and having a longitudinal core within each said tubular membrane in supporting contact therewith substantially continuously along its length, each said filter cartridge being mounted for removal and replacement as a unit between said manifolds.

* * * * *